DECIMAL POINT MECHANISM FOR CALCULATING MACHINES

Filed Dec. 1, 1953 8 Sheets-Sheet 1

RICHARD V. REPPERT
INVENTOR.
BY D. Clyde Jones
ATTORNEY

Jan. 26, 1960 R. V. REPPERT 2,922,573

DECIMAL POINT MECHANISM FOR CALCULATING MACHINES

Filed Dec. 1, 1953 8 Sheets-Sheet 2

BY

RICHARD V. REPPERT
INVENTOR.

D. Clyde Jones

ATTORNEY

RICHARD V. REPPERT
INVENTOR.

BY D. Clyde Jones

ATTORNEY

RICHARD V. REPPERT
INVENTOR.
BY D. Clyde Jones
ATTORNEY

RICHARD V. REPPERT
INVENTOR.

BY D. Clyde Jones
ATTORNEY

RICHARD V. REPPERT
INVENTOR.

BY D. Clyde Jones
ATTORNEY

RICHARD V. REPPERT
INVENTOR.
BY D. Clyde Jones
ATTORNEY

RICHARD V. REPPERT
INVENTOR.
BY D. Clyde Jones
ATTORNEY

United States Patent Office 2,922,573

Patented Jan. 26, 1960

2,922,573

DECIMAL POINT MECHANISM FOR CALCULATING MACHINES

Richard V. Reppert, Rochester, N.Y.

Application December 1, 1953, Serial No. 395,379

12 Claims. (Cl. 235—63)

This invention relates to decimal point mechanism for calculating machines and has for its object the automatic positioning of decimal point indicators in the various groups of numeral dials provided in these machines for displaying the multiplicand, multiplier and product, as well as the dividend, divisor and quotient.

A further object is the provision of decimal point keys for the rows of digit keys operable in their proper sequence when the factors, the multiplicand and multiplier or the dividend and divisor are introduced into the machine by the operation of the key board.

Another object is the provision of individual decimal point indicators for the dials of said groups of dials and under control of the key board including the decimal point keys, to display an indicator in said dials to denote the decimal point of the figures shown in the dials upon conclusion of a calculating operation.

A still further object is to provide decimal point indicators for the group of dials in the form of miniature electric light bulbs and to light the particular light bulb which denotes the decimal point of a figure shown in a group of dials upon conclusion of a calculating operation. Thereby small light bulb assemblies can be placed adjacent to the dials and can be controlled for selection by devices located at a convenient space in the machine casing. This provides flexibility and obviates the requirement of bulky mechanical structure.

This device is in the nature of an auxiliary mechanism or attachment for calculating machines and for the purpose of illustrating its application to a calculating machine, it is shown as applied to the machine shown in the Patent No. 1,643,710 for Calculating Machine to C. M. F. Friden and reference is to be had to this patent for a detailed description thereof. This machine has the usual plurality of rows of digit keys operable for multiplication and division for introducing the factors and also has three groups of numeral dials to visually display the factors and the product or quotient respectively. Also provided is the usual accumulator or register carriage which is movable by means of a shifting device to move the carriage step by step in relation to the actuating devices for the accumulator dials during calculating operation; furthermore multi-cyclic drive means for the actuating devices and a number of control keys for conditioning the machine for the various operations.

Figure 23:
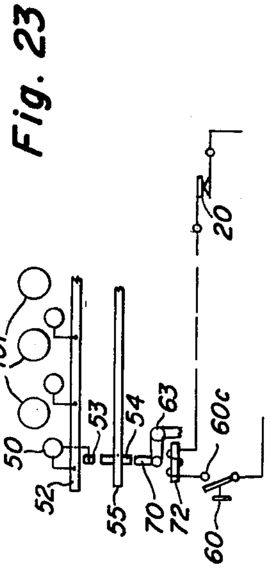
Figures 3, 4:
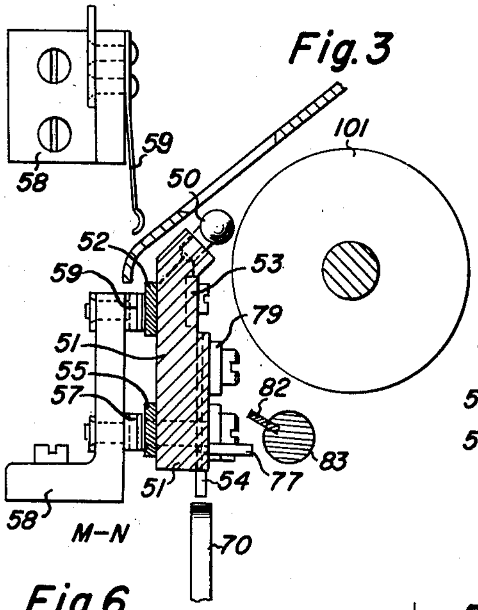
Fig. 3 is a sectional view of the decimal point indicating devices for the accumulator dials taken on the line 3—3 of Fig. 5.
Fig. 4 is a plan view of the brush 59 that conducts the current to the conductor rail 52 on the carriage.
Figure 5:
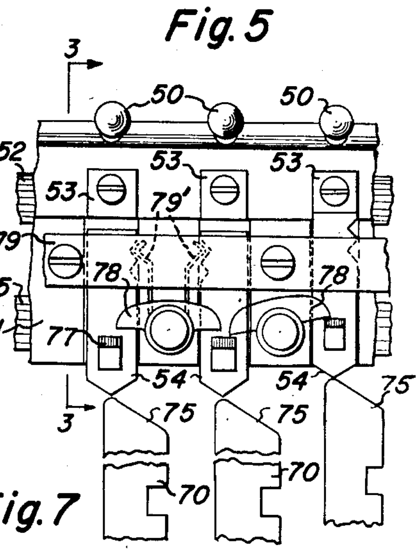
Fig. 5 is a partial elevation of the decimal point indicating devices for the accumulator dials mounted in the register carriage and shows the key operated setting or lighting members 70 for same.
Figure 8:
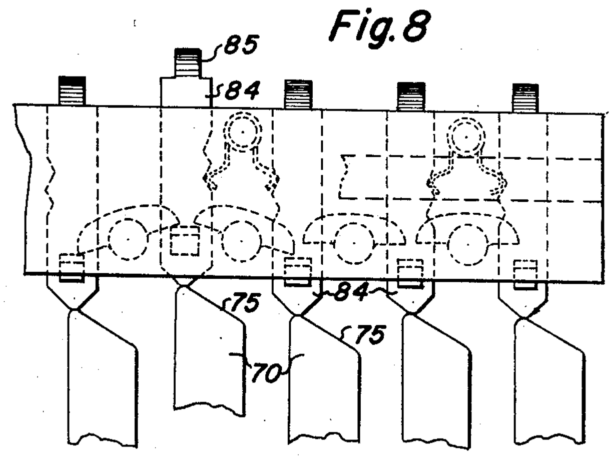
Figure 9:
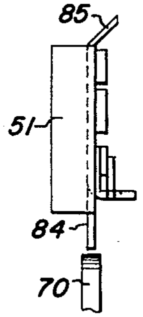
Figure 10:
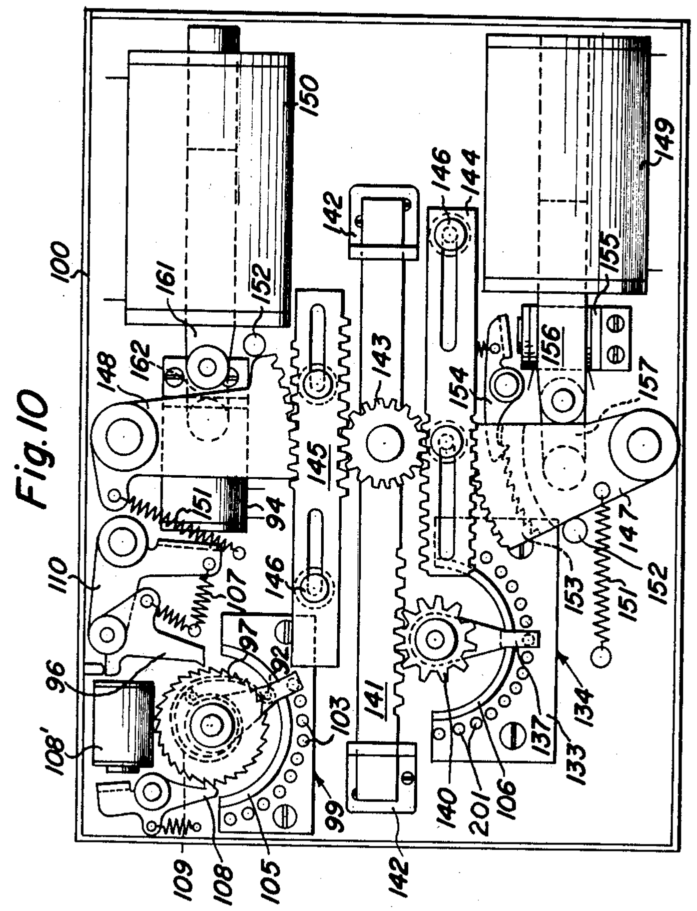
Figure 11:
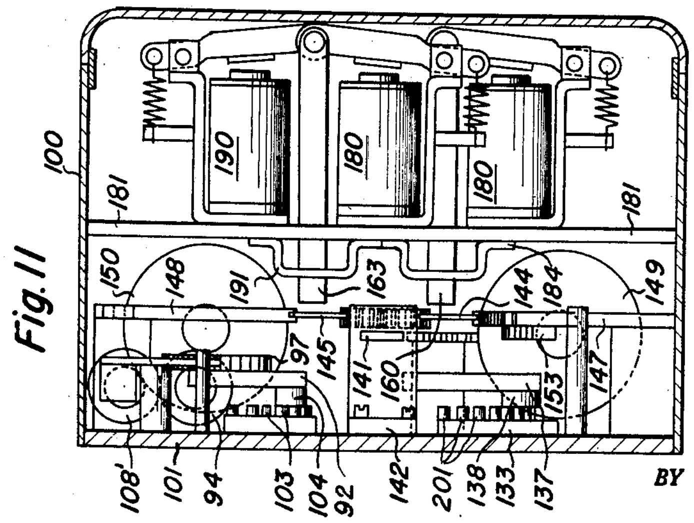
Figure 12:
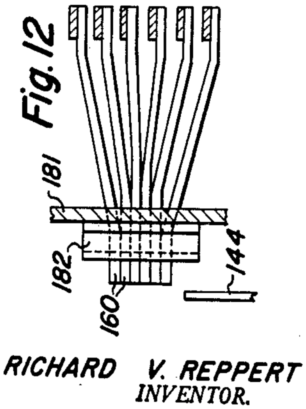
Figure 13:
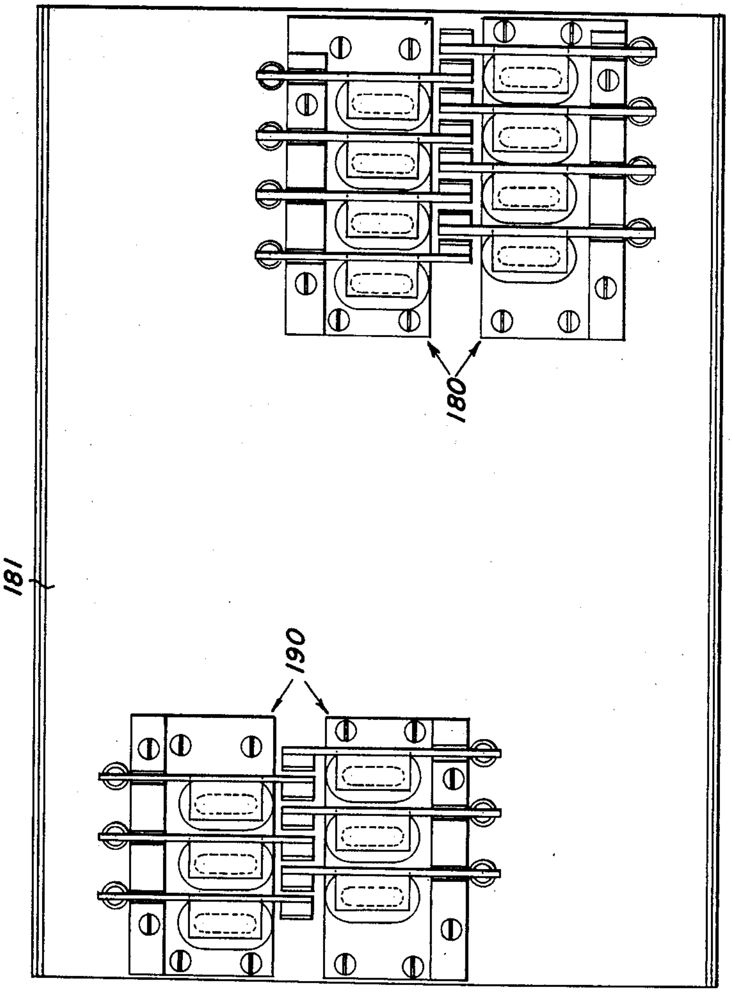
Figure 14:
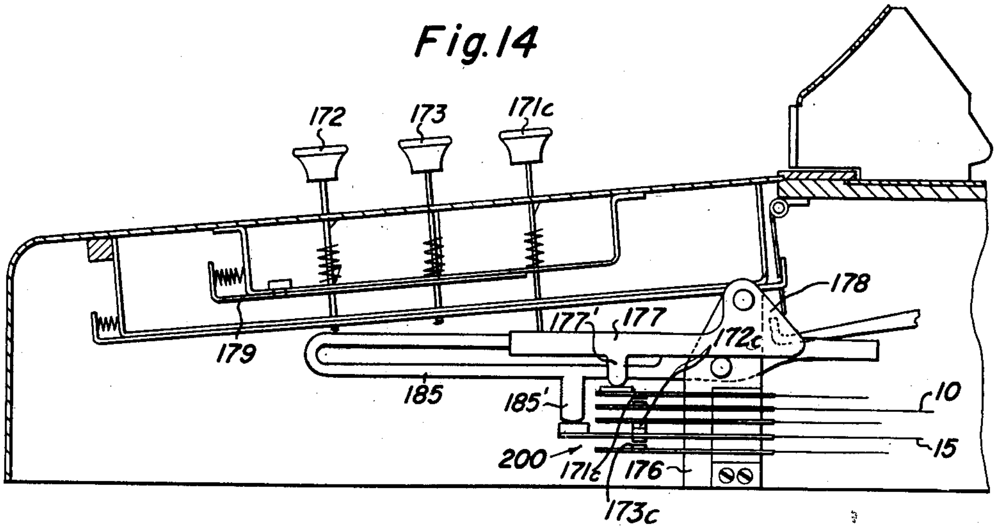
Figure 15:
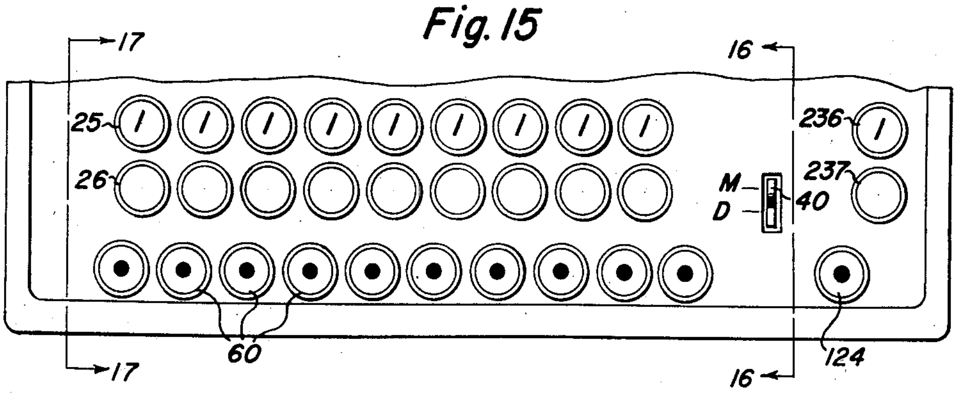
Figure 16:
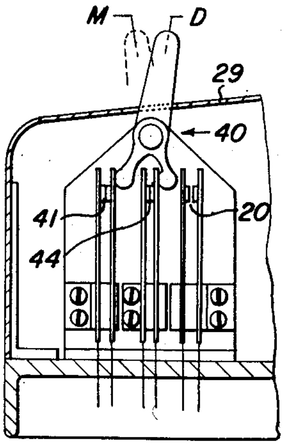
Figure 17:
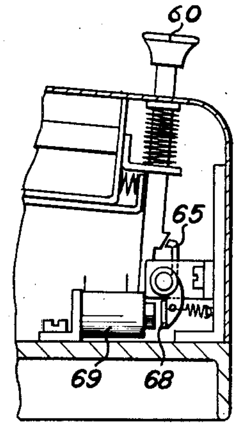
Figures 18, 19, 20, 21:
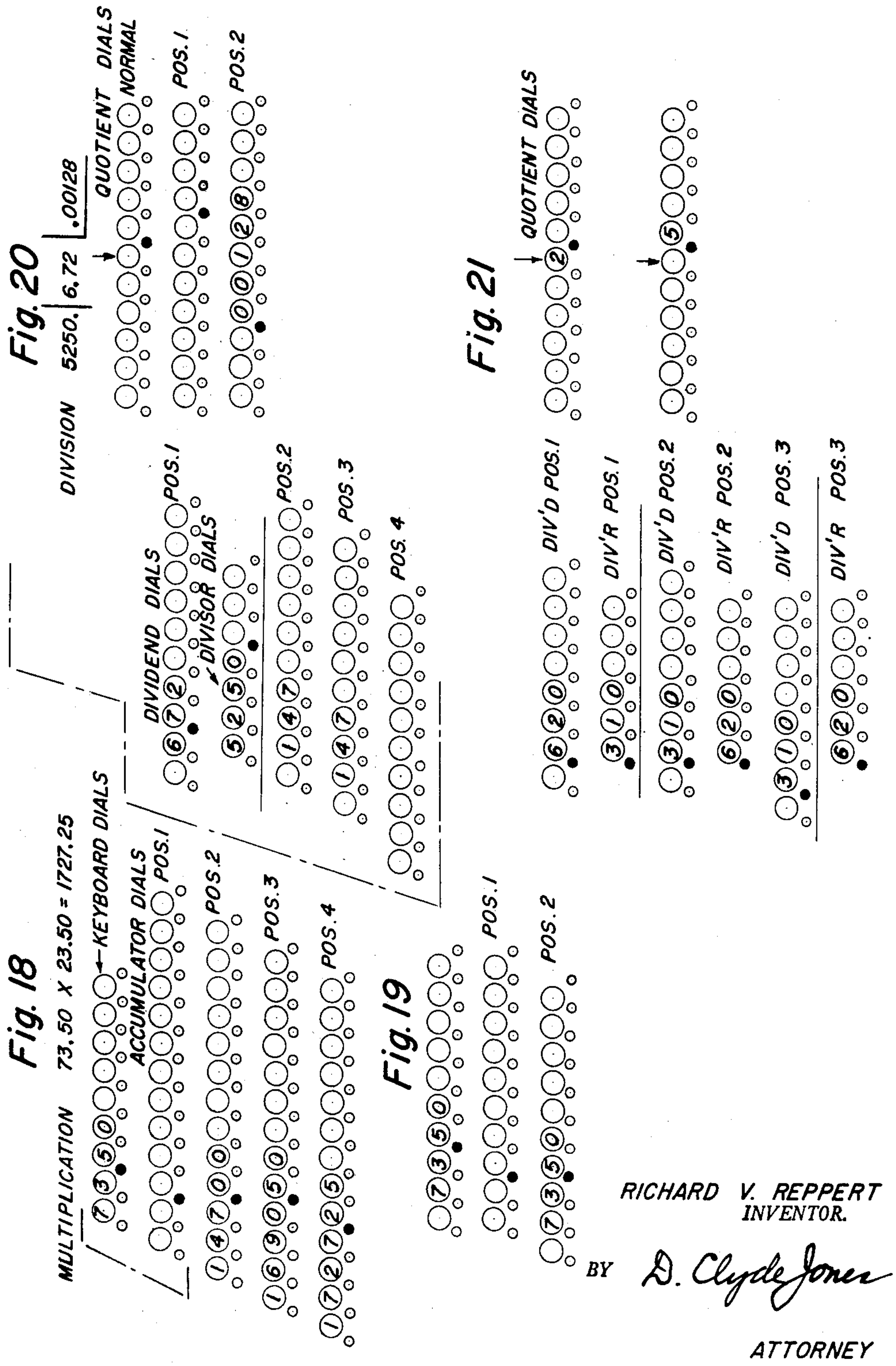
Figure 22:
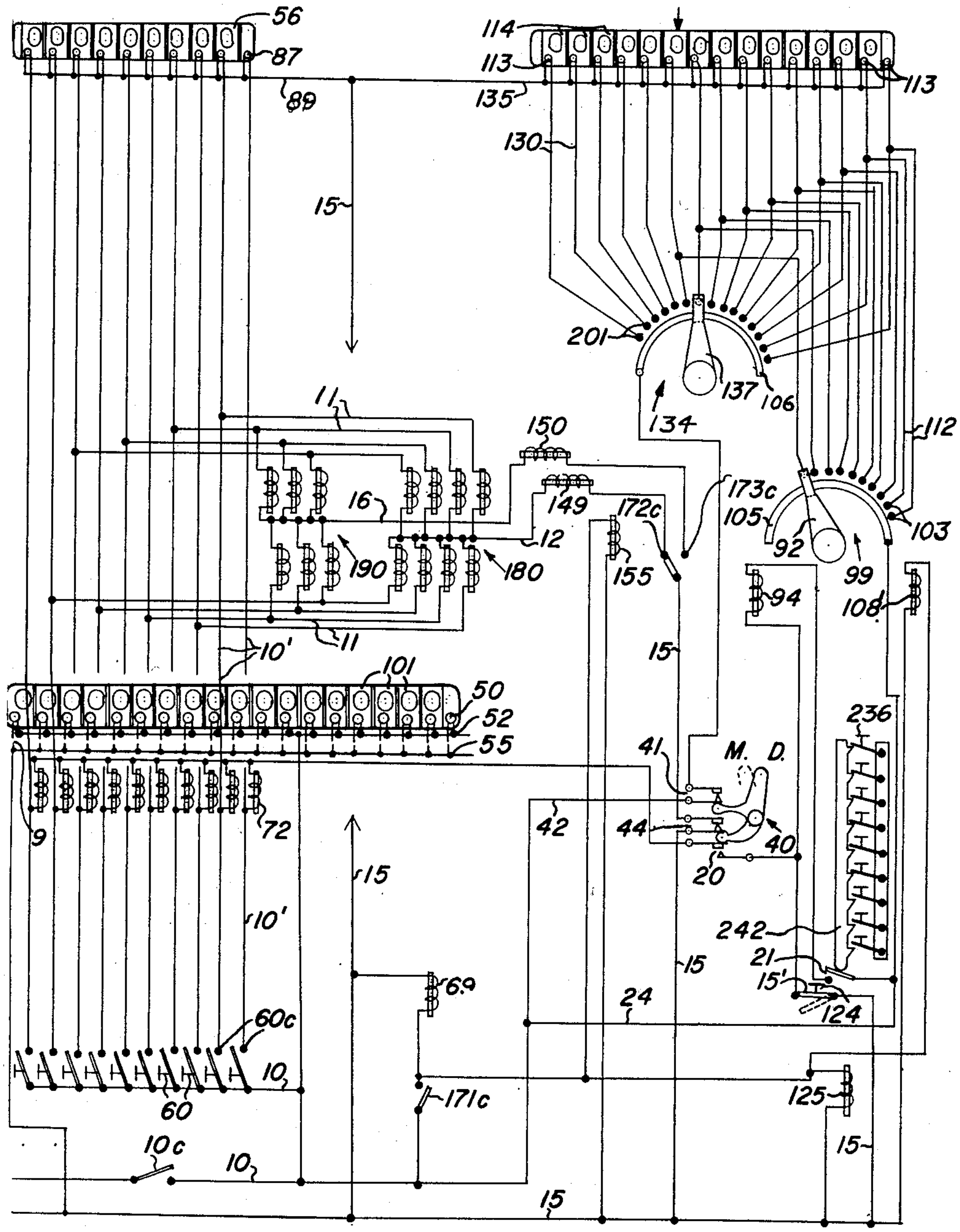

Figs. 8 and 9 are details of a modification of the decimal point indicating devices for the accumulator dials shown in Figs. 3, 4 and 5 and in this modification mechanical members 84 are substituted for the light bulbs;

Fig. 10 is a plan view of the multiplier-quotient decimal point mechanism mounted on the bottom plate of the casing 100;

Fig. 11 is a side elevation of the mechanism shown in Fig. 10 with the side cover removed;

Fig. 12 is a detail of the stops 160 showing their converging form and their relation to the solenoid-operated rack member 144;

Fig. 13 is a plan view of the magnets 180 and 190 mounted on the casing plate 181, with the casing cover removed;

Fig. 14 is a fragmentary longitudinal sectional view, showing the control keys and the contacts actuated thereby;

Fig. 15 is a partial plan view showing the location of the decimal point keys 60 of the instant invention on the key board and the operation selecting switch 40 of the instant invention;

Fig. 16 is a detail of the operation selecting switch 40;

Fig. 17 is a detail of the magnet operated decimal point key release device;

Figs. 18 and 19 are diagrams illustrating multiplication examples;

Figs. 20 and 21 are diagrams illustrating division examples;

Fig. 22 is a circuit diagram, showing schematically the decimal point indicating mechanisms for the three groups of dials and the controls for same by the decimal point keys, the control keys and the operation selecting switch; and Fig. 23 is a diagrammatic view showing the operation of the contact 53 by operation of the left-most decimal point key, to close the circuit to the left-most decimal point indicator.

*Operation*

Before describing the mechanism in detail, its operation is briefly described by way of examples.

The multiplicand is set up on the key board, starting in the leftmost row of keys and the multiplicand decimal point key, now provided, is operated in its proper sequence. This operation causes a decimal point indicator to be shown in the key board dials which display the multiplicand, and also sets or shows a decimal point indicator in the accumulator dials. Fig. 18 shows schematically, the product dials or accumulator in the register carriage, the key board or multiplicand dials and the decimal point indicators set up in these dials. It will be observed that the decimal point indicator in the accumulator dials is shown as a solid black indicator and is manually positioned for the next higher decimal order dial and this is necessary because the accumulator carriage is shifted to the left one step after every digital multiplication, see Fig. 19. After the multiplication of the multiplicand by a multiplier digit, the accumulator carriage is shifted to position 2 and the decimal point indicator will then be correctly positioned, as shown. The foregoing applies, of course, to multiplication by any digit. It is therefore provided that the decimal point keys, when operated for setting up a multiplicand, set the decimal point indicator for the accumulator dial of next higher decimal order, see Fig. 18. Let us assume that 73.50 is to be multiplied by 23.50 Position 1 shows the keyboard dials displaying the multiplicand and the accumulator dials, inclusive of the decimal point indicators. Position 2 shows the dials after multiplication by "2." Position 3 shows the dials after multiplication by "3."

It will be observed that the decimal point indicator remained in the same decimal order position relative to the keyboard when multiplication took place and the carriage was shifted and this is because every carriage shifting operation represents a multiplication by ten so that the decimal point indicator must remain stationary in relation to the shifting carriage dials. The foregoing applies for every multiplication by the integers of a multiplier, in this case "23," but upon multiplication by a decimal fraction multiplier, in this case ".50," the decimal point indicator will move with the carriage because such multiplication does not change the decimal point position of the product figure.

In said example the multiplier decimal point key is now operated and causes the decimal point indicator to move with the carriage. Position 4 shows the position of the accumulator dials after multiplication by .50 and the multiplication is complete with the decimal point in correct position in the product figure shown in the dials.

The operation of the multiplier keys inclusive the multiplier decimal point key now provided, causes the setting of a decimal point indicator in the multiplier-quotient dials, so that upon completion of a multiplying operation, the multiplier with its decimal point is displayed in the dials, as is described in detail hereinafter.

For division an operation selecting switch is provided on the key board and is settable to multiplication or division to thereby change certain circuits as will be more fully described hereinafter.

As described in said patent to Friden, upon setting up and introducing the factors of a division problem, the leftmost digits of both factors are operatively aligned irrespective of their digital value, and if in this position the divisor is not divisible in the dividend, the accumulator or, in this case, the accumulator carriage is shifted one decimal order to the left and thereby the actuating device for the quotient dials is likewise shifted to the next dial to the right.

The dividend is set up on the key board and a decimal point key provided according to the present invention is operated in its sequence. The dividend including the decimal point, will thereby be shown in the key board dials and is subject to inspection as a check on the operation of the keys. The dividend is then transferred into the accumulator dials by an adding operation, as fully described in said patent. This adding operation clears or re-sets the key board, inclusive of the decimal point key, which is incorporated in the machine as modified by the present invention, and readies the key board for setting up the divisor. The operation of the dividend decimal point key causes the setting of a decimal point indicator in the quotient register dials that are setable to show the digits of the quotient. In Fig. 20 an example is shown. The dividend 6.72 is shown in the accumulator or register carriage dials (dividend dials) and the divisor 5250. is shown in the keyboard or divisor dials, after these factors have been set up on the key board and the operation of the respective factor decimal point key has operated the decimal point indicating mechanism for the quotient dials. Upon a dividing operation the first quotient figure is "1" with a remainder of "147" as shown in position 2 at the left side of Fig. 20; thereupon the dividend carriage is shifted as shown in position 3. In this position there are two subtracting cycles and after another shifting of the carriage, there are eight subtracting cycles and no remainder, as shown in position 4.

In said Fig. 20 an arrow indicates the quotient dial that is operatively connected to receive the first digit of the quotient if the divisor is divisible in the dividend in the relative position shown in this figure and a solid black indicator, indicates the decimal point indicator in the quotient dials that is in normal position or normally lighted. In position 1 of the quotient dials, the solid black indicator indicates the positon of the indicator after the dividend decimal point key has been operated and in position 2 of the quotient dials, the solid black indicator, indicates the decimal point position of the indicator after the divisor decimal point key has been operated.

After the divisor has been set up on the key board, dividing operation proceeds as fully described in said patent, and position 2 shows the quotient dials upon conclusion of the dividing operation with the decimal point indicator correctly positioned.

It will be observed that the decimal point indicator for the quotient dials is first shifted or positioned to the right from normal position, as many decimal orders as are integers in the dividend, in this case "one," and then positioned to the left, as many decimal orders as are integers in the divisor, in this case "four," thereby it is positioned as many decimal orders from its normal position as is the difference of the number of integers in the dividend and divisor. Thereby it is positioned correctly to indicate the decimal point of the quotient shown in the dials upon conclusion of the dividing calculation. In said Fig. 20 there are shown a number of ciphers to the left of the first dial subject to setting operation to show the digits of the quotient and from the example, the necessity for these ciphers is apparent. They are preferably indicated on a small plate that is suitably mounted and in proper relation to the decimal point indicators provided for the ciphers. As stated, the normal position of the decimal point indicator for the quotient dials is as shown in Fig. 20 and on hand of the examples shown in Fig. 21, it is apparent that this is the correct position.

In the first example .620 is divided by .310 and in the second example .310 is divided by .620. As both factors are decimal quantities and have no integers, the decimal point indicator of the quotient dials remains in its normal position and is not shifted. In the first example the divisor is divisible in the position shown and the quotient dial which is the first to be actuated, will register "2" subtractions. In the second example, the divisor is not divisible in the position shown and the dividend carriage is shifted as shown in position 3, thereby the second quotient dial is subject to actuation and will register 5 subtractions. In both examples the decimal point indicator is positioned correctly.

As the dividend is a diminishing quantity, a decimal point indicator for same would be meaningless and when the operation selecting switch 40, now provided, is set for division, the circuit for the register or dividend carriage decimal point indicators is opened, as shown in Fig. 22.

Figure 1:
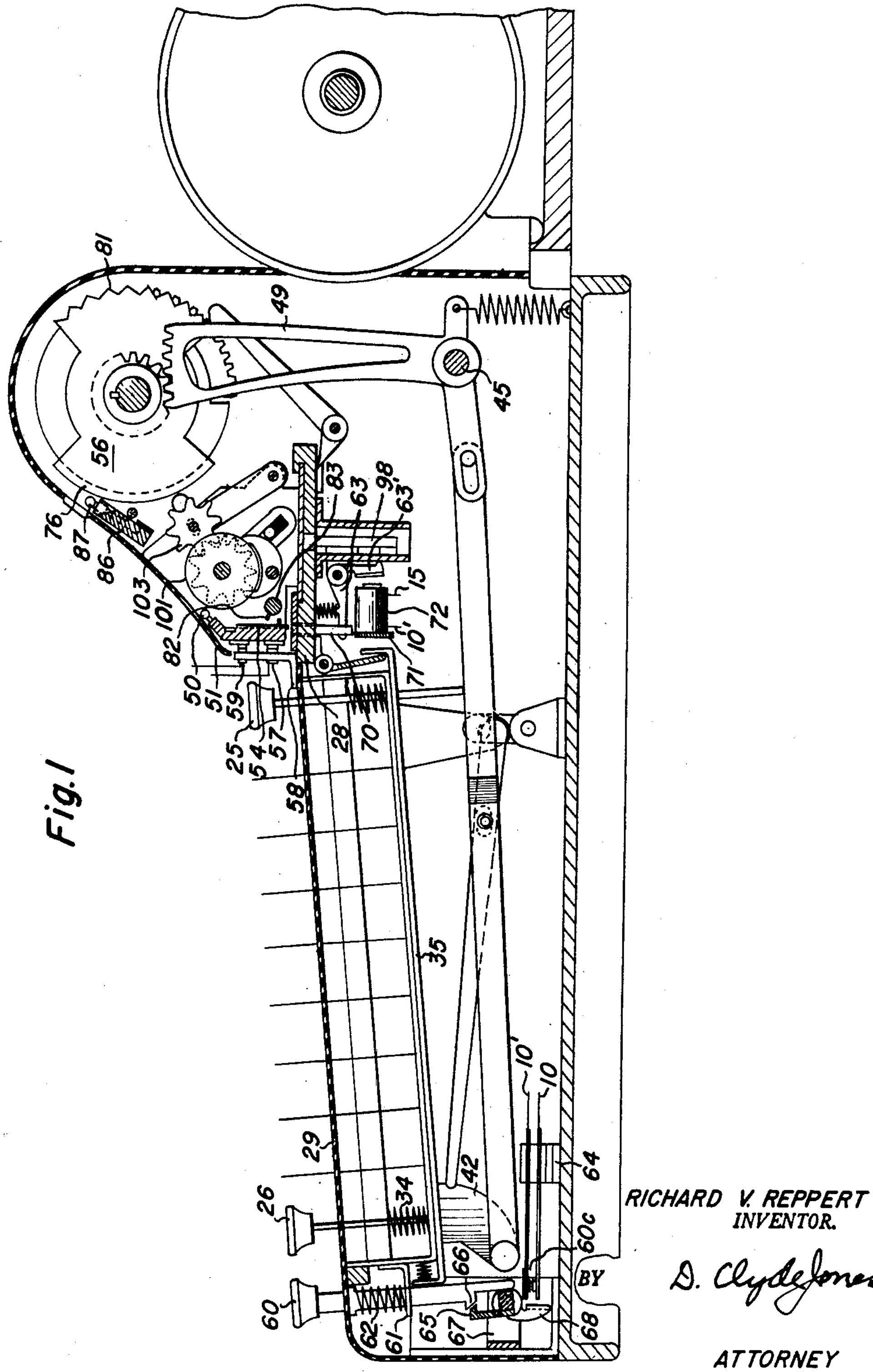
Fig. 1 is a partial longitudinal section of a calculating machine constructed in accordance with the above-noted patent as modified to incorporate the features of the present invention, showing particularly the structure and location of the decimal point keys on the key board and the decimal point indicating devices operated thereby.

See Figs. 1 and 5. A series of decimal point keys is provided and the keys are operable in their proper sequence when a factor is set up on the key board, to thereby operate the decimal point indicating devices for the accumulator dials, the keyboard dials and the revolution counter or multiplier-quotient dials. For each row of digit keys, a decimal point key 60 is provided (see Fig. 15) and is slidably mounted in the key board plate 29 and the bracket 61 (Fig. 1). Upon depression of a key against the tension of its spring 62, it will close a contact *60c*, mounted on the bracket 64 and will be held in depressed position by a universal lock plate 65, engaging a projection 66 on the key. The lock plate is pivoted in the brackets 67 and a lever 68 mounted on the lock plate serves as armature for a magnet 69 which, when energized, will oscillate the plate to release a depressed key. See Figs. 1 and 17. The closing of contact 171*c* (Fig. 14) closes the circuit to the magnet 69, as will be described further hereinafter.

A main switch 10*c*, see Fig. 22, is operable to extend the line 10 to one side of all of the contacts 60*c* and the closing of a contact by a decimal key 60 completes a circuit through a decimal indicator 87 for the keyboard dials 56 via conductors 10' and 15 and through a respective decimal point indicator setting device 72 for the accumulator via contact 20 and line 15 as will be more fully described. See Circuit diagram Fig. 22.

As set forth in said patent to Friden, a series of accumulator dials 101 is provided in the carriage and the dials are subject to actuation to show the digits of a product or dividend. A decimal point indicator 50 is now provided for each dial, in the form of a small electric light bulb which is lightable to indicate the decimal point of the figure shown in the dials. See Figs. 1, 3, 5 and 22.

These indicators 50 are mounted on a transverse insulator 51, which is mounted on the carriage frame. A transverse conducting rail 52, see Fig. 3, on the insulator connects to one side of all of the indicators. The other side of the indicators connects to individual contact plates 53 (Figs. 3 and 5) inserted in said insulator and movable contact members 54 slidably mounted in grooves on the insulator to selectively make contact with the fixed contact plates. A second transverse conducting rail 55 is mounted on said insulator and connects to all of said movable contact members.

Two brushes 57 and 59 mounted on a bracket 58 carry the line current to the conducting rails, see Figs. 3 and 22. The bracket 58 is fastened to the machine frame near the left side of the machine. The decimal point keys 60 have the function to light a selected indicator by moving the movable contact 54 that is in operative relation therewith, to contact the respective contact plate 53 and thereby close the circuit. For each decimal point key a setting or lighting device is provided, and comprises a bell crank 63 mounted on the machine frame, a vertical plate 70 of non-conductive material connected to the bell crank and a magnet 72 mounted on a transverse plate 71. See Fig. 1. Upon closing of a contact 60*c* by the respective decimal point key, the circuit for the respective magnet is closed through normally closed switch 15' and thereby the arm 63' of the bell crank, serving as armature, is actuated and moves the plate 70 upward, to move the contact member 54 that is in operative relation therewith, to close the circuit and light the indicator. Each magnet 72 is wired to the respective decimal point key contact 60*c*, so that upon operation of the decimal point key, the circuit is closed and causes operation of the magnet and the lighting of the register decimal point indicator, operatively connected thereto. The vertical plates 70 also serve to move adjacent contact members 54 upward to close indicator circuits, upon step by step movement of the register carriage and to this end, each plate 70 has a cam surface 75 (Fig. 5) which is engageable by the lower end of each movable contact member 54, as these members are moved laterally by the step by step movement of the carriage, see Fig. 23. Fig. 23 shows schematically the operation of closing the circuit for an indicator by the operation of the decimal point key. In Fig. 22 *g* indicates the space or gap corresponding to the space between the leftmost contacts 53 and 54. This space is closed by operation of the leftmost decimal point key to light the leftmost indicator. Since, obviously, only one indicator should be set to indicate the decimal point, means are provided to reset or extinguish an indicator when the next one is set and therefore a reset lever 78 is mounted on the insulator 51 between adjacent movable contact members 54. See Figs. 3 and 5. Each contact member 54 has an extension 77 and the respective reset lever overlies the extensions of two adjacent members 54. The upward movement of a contact member 54 will therefore push down the adjacent member 54 and all contact members are held in normal and in set position by the springs 79' engaging cam notches on the sides of adjacent contact members 54. The contact members are held in their grooves by the lock plate 79. The extensions 77 on the contact members also serve as a resetting means for the last set member. A transverse rod 83 (see Fig. 1) with an inserted key 82, is oscillatable in any suitable manner by the keyboard dial resetting means, referred to in said patent to Friden, to engage and push down any contact member 54 that is in set position. In Figs. 8 and 9 an alternate decimal point indicating mechanism is shown and differs from the one previously described in that the indicating members 84 are normally non-indicating and are selectively settable by the magnets 72 to move the selected indicator upward to bring the extension 85 thereon, to indicating position.

Figure 6:
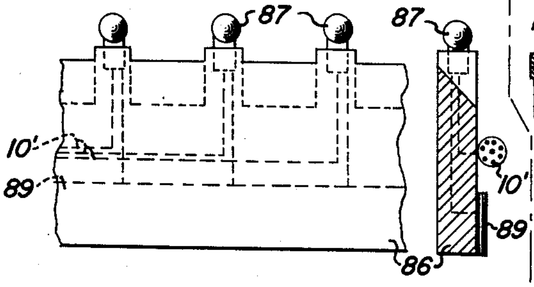
Fig. 6 is a detail of the decimal point indicating devices for the key set dials 56.

As described in said patent to Friden, the key set actuators 81 have flanged discs 56 that are equivalent to dials, to display the digits of the factors set up on the key board. Individual decimal point indicators 87 are now provided, to indicate the decimal point of the factor displayed in these dials. See Figs. 1 and 6. An insulator 86 is transversely mounted on the machine frame; and for each dial a small electric light bulb 87 is mounted thereon and is lightable to indicate the decimal point position of the figure shown in the dials. Individual conductors 10' (Fig. 6) extend from the contacts 60*c* (Fig. 1), closable by the operation of the decimal point keys, as described, to the respective decimal order light bulbs and a common return wire 89 (Fig. 6) extends to the return line 15 of the circuit. Operation of a decimal point key when operated in setting up the decimal point of a factor, will therefore display the decimal point of the factor in the dials.

Figure 2:
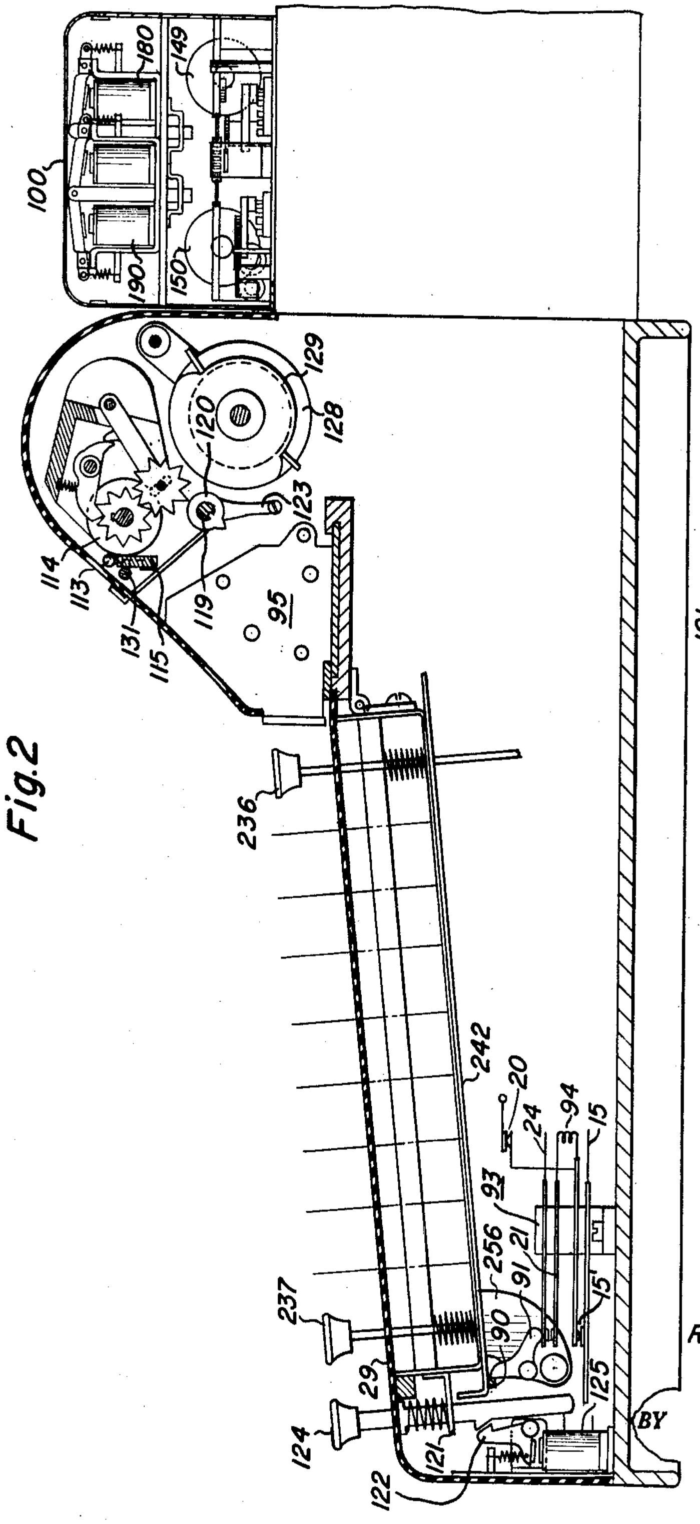
Fig. 2 is a partial longitudinal section of this machine showing particularly the multiplier digit keys, and the multiplier-quotient decimal point indicating devices.

In said patent to Friden it is fully described how the operation of the multiplier digit keys 236 (Fig. 15) controls the cycles of the actuators for the register dials and how the power actuated means, jointly with the shifting of the register carriage, sets a group of quotient register dials to show the digits of the multiplier. A multiplier decimal point mechanism is now provided to indicate the decimal point of the multiplier figure shown in the dials. As described in said patent, upon operation of any one of the multiplier digit keys, a lock bar 242 (Fig. 2) is moved rearward and an extension 90 now provided on said bar, engages a small bell crank 91 pivotally mounted on the member 256. Movement of the bar 242 moves the bell crank to close a contact 21, mounted on a bracket 93 and this closes a circuit for a feed magnet 94 (Fig. 10) located in the control casing 100, mounted in the rear of the machine. See Fig. 22. This casing contains the mechanism that controls the setting of the decimal point indicators for the multiplier-quotient dials by an electrical switching arrangement.

Figure 7:
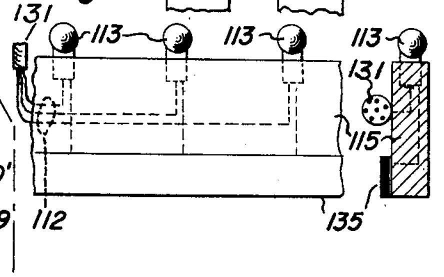
Fig. 7 is a detail of the decimal point indicating devices for the revolution counter or multiplier-quotient dials.

The magnet 94 and its armature 110 are mounted on the casing plate 101 and a feed pawl 96 connected to the armature engages a ratchet wheel 97, connected to a contact arm 92 of a multiple contact switch 99 (best shown in Fig. 10). The contact arm is of non-conducting material and carries a conducting contact plate 104 (Fig. 11) which bears on the arcuate conductor 105 (Fig. 10) and on the selected contact 103 of said switch. See Figs. 10, 11 and 22. Normally the position of the feed pawl and contact arm is as viewed in Figs. 10 and 22. The pawl is held disengaged from the ratchet by the force of the armature spring 107 (Fig. 10) and upon operation of a multiplier digit key, the magnet is operated and the feed pawl engages the ratchet and moves the contact arm one contact position, where it is held by the detent 108 (Fig. 10) against the tension of the reset spring 109 mounted on the ratchet wheel. Every operation of a multiplier digit key will move the contact arm one contact step and from each contact a conductor 112 (see Fig. 22) extends to the respective decimal point indicator light 113 for the multiplier dials 114 that serve also as quotient dials. The conductors are gathered into a cable 131 (see Figs. 2 and 7) which leads from the switch to the insulator 115 on which the decimal point indicator lights are mounted, as will be more fully described. See Figs. 7 and 22. Normally the contact arm is in the position shown in Fig. 22 and the operation of the first multiplier digit key moves it to the next contact, etc. A multiplier decimal point key 124 is depressably mounted in the key board plate 29 (Fig. 2) and the bracket 121 and upon operation opens the contact 15', mounted on the bracket 93, and is held in set position by the detent 122. This contact, when closed, is a part of the aforementioned feed pawl circuit, so that opening of this contact by the multiplier decimal point key, opens the feed pawl circuit and terminates the spacing functions of the contact arm 92 by the multiplier digit keys. The operation of the multiplier decimal point key, therefore, keeps the contact arm in its last set position and thereby sets the decimal point indicator in the quotient dials in its correct position.

Opening of the contact 15' also interrupts the circuit to magnet 72 thereby releasing plate 70 for restoration by the spring illustrated in Fig. 1, and terminating its accumulator decimal indicator spacing function. Thereafter, the last energized decimal indicator 50 remains in fixed ordinal relation to the accumulator during subsequent multiplication by each of the decimal digits of a multiplier and during the ordinal shift of the accumulator which follows.

Upon conclusion of the multiplying operation, the clear key 237 is operated, see Fig. 14, as described in said patent, and an extension 177' provided on the lever 177 operated by said key, closes a contact 171c on the bracket 176, to thereby operate a magnet 125 that operates the detent 122 to release the decimal point key 124. See Figs. 2 and 14.

As stated, a group of dials 114 (Fig. 2) is provided in said patent to display the digits of the multiplier and the quotient and furthermore means are provided to actuate the dials in succession and record the digital cycles in the respective dials.

The decimal point indicating mechanism now provided to indicate the decimal point of the figure shown in these dials is selectively settable for multiplication or division, by the operation of an operation selecting switch 40 (Fig. 15), suitably located with its operating lever extending through the key board. Its functions are more fully described hereinafter under the heading "Circuit diagram." See Figs. 7, 10, 11, 16 and 22. The multiplier-quotient decimal point indicating light bulbs 113 are mounted on the insulator 115 and a conductor 130 (see Fig. 22) extends from each light, through a cable 131 (see Figs. 2 and 7), to a contact 201 on a switch plate 133 (Fig. 10) of the switch 134 housed in the control casing 100 mounted on the rear of the machine. The other side of the indicator lights connects to a common conductor 135, see Fig. 22, and from it to the return line 15. The said switch plate is mounted on the bottom of the casing and an arcuate contact member 106 on the switch plate is connected to the line current. The member 106 is connected to the contact 41 and through that contact to the line 42 which extends to the main line 10. A non-conducting contact arm 137 is pivotally mounted on the casing and has a small conducting contact plate 138 that contacts the arcuate contact member 106 and the selected one of the contacts 201 on the switch plate 133.

A pinion 140 is connected to the contact arm and engages the rack portion of a differentially actuated plate 141 slidably mounted in brackets 142. A pinion 143 pivoted on this plate engages two racks 144 and 145, one on each side of the pinion, and slidably mounted on studs 146. These racks, in turn, are engaged by sectors 147 and 148, respectively, which are oscillatable by the solenoids 149 and 150, respectively. These sectors are mounted on the bottom plate of the casing 100 and are held in normal position by their springs 151 against stops 152. The sector 147 carries a ratchet plate 153 which is engageable by a detent 154 to hold the sector in set position and the detent is releasable by the small magnet 155, to let the sector reset to normal position.

The sector 147 is connected to the solenoid plunger 156 by the link 157 and the movement of the plunger into the solenoid is limited by selectable stops 160 (Figs. 11 and 12) which intercept the rack 144 and are settable by magnets 180 under control of the decimal point keys 60. The sector 148 is connected to the non-magnetic extension of the plunger 161 by the link 162, and, in this case, the plunger acts to push the sector and move the rack 145 to the left, as viewed in Fig. 10. The movement of the rack is limited by selectable stops 163 (Fig. 11) which intercept the rack 145 and are settable by magnets 190 under control of the decimal point keys 60.

The solenoid 149 moves the rack 144 rightward, as viewed in Fig. 10 and at this phase the solenoid 150 is inactive and the sector 148 holds the rack 145 stationary. The movement of the rack 144 will move the plate 141 also rightward and this causes the pinion 140 to rotate the contact arm 137 clockwise to a selected contact position. This contact position positions the contact arm as many contact positions from its normal position as there are integers in the dividend. See Figs. 20 and 22.

The settable stops 160 are movable to intercepting position for the rack 144 by a group of magnets 180 mounted on the casing plate 181. See Fig. 11. The stops 160 are connected to the armatures of the magnets and are formed to converge and are guided by a bracket 184 mounted on the opposite side of the casing plate 181. See Figs. 11 and 12. The reason for converging the stops is that the magnet spacing is greater than the stop spacing at the rack intercepting position. These stops and the solenoid 149 are subject to operation when the decimal point key for the dividend is set up on the key board. The operation of the respective decimal point key closes the circuit for the respective stop magnet 180 and the solenoid 149 is in series therewith. See Fig. 22. The resulting movement of the sector 147 positions the rack 144 against the stop set by the magnet and moves the plate 141 to rotate the contact arm to the selected contact. The detent 154 holds the sector in set position when the key board, including the decimal point key, is cleared, prior to setting up the divisor and this opens the circuit for the stop magnet and the solenoid.

The operation of the decimal point key when setting up the divisor closes the circuit for the respective one of the stop magnets 190 and the solenoid 150 and thereby causes movement of the differential plate 141 to the left, as viewed in Fig. 10, and causes counter-clockwise rotation of the contact arm 137 to the selected stop position. The magnets 190 are also mounted on the casing plates 181 and the stops 163, connected to the magnet armatures are guided in a bracket 191, on said casing plate 181.

The contact arm is moved as many contact positions from its set position as are integers in the divisor, thereby positioning it as many contact positions from normal position as is the difference in the number of integers in the dividend and divisor. This closes the circuit for the decimal point indicator in the quotient dials that indicates the correct decimal point of the quotient shown in the dials upon conclusion of the dividing operation.

As described in said patent, after the dividend is set up in the key board it is transferred into the register dials by a single cycle adding operation which causes resetting of the key board and the actuators and then the key 171 is operated to cause resetting of the dividend decimal point key. The machine is set for dividing operation by the setting of the operation selecting switch 40, see Figs. 15, 16 and 22.

During indexing of the dividend the machine is set in adding condition by the operation of the control key 172, and, following dividend entry into the accumulator, the key 173 is operated to reset key 172 and to set the machine in repeat condition. A contact assembly 200 (Fig. 14) is mounted on a bracket 176 and is operable by the control key 172 to close the contact blade **172*c* and to open the contact 173*c*. Operation of the key 173 resets the key 172 and opens contact 172*c* thereby closing contact 173*c* and switching the circuit from the solenoid 149 which functions when the dividend is set up in the key board, to the solenoid 150, which functions when the divisor is set up on the key board. As described in said patent to Friden, the operation of key 172 actuates the lever 185 and an extension 185', now provided on said lever operates to hold open the contact 173*c*** when the machine is set in adding condition.

At the termination of a dividing calculation, the key 171 (see Fig. 14) is operated to actuate the lever 177 to clear the key board, and the extension 177' on the lever 177 closes the contact **171*c* on the bracket 176, to energize the magnet 69** and reset a set decimal point key.

*Circuit diagram Fig. 22*

Upon closing of the switch **10*c* the line 10 extends to one side of contacts 60*c* controlled by decimal point keys 60 and also to the conductor 52 on the accumulator carriage, which carries the current for the decimal point indicator lights 50 in the carriage. The contacts 60*c* are under control of the decimal point keys 60 and from each contact a conductor 10' extends to the respective decimal point indicator light 87 for the key set dials 56. From the indicator lights 87, a common conductor 89 extends to the common return line 15. Each conductor 10' also connects to the small magnet 72 which operates to light a decimal point indicator 50 in the register carriage. The circuit for the lights 50 is completed by contact member 54 and common conductor 55 connected to return line 15; and the circuit for magnets 72 is completed by a common conductor connected by serial switches 20 and 15' to the return line 15**.

In the diagram Fig. 22 an open circuit is indicated by a gap between the conductors 55 and 52 for the indicator lights, and the operation of the selecting magnets 72 closes the gap and thereby the circuit, by operating a movable contact member 54, which completes a circuit through an indicator 50 and the conductor 55 to the return line 15 as described, see Fig. 23.

The small magnets 72 have a common return conductor which extends to the contact 20 that is closed during multiplying operation. From this contact the circuit extends to the contact 15'. The contact 15' remains closed during multiplying operation until the multiplier decimal point key is operated and opens the circuit, so that the armature of the respective magnet 72 resets and thereby terminates the setting of decimal point indicators in the accumulator dials.

The closing of the switch **10*c* also extends the line 10 through conductor 24 to the contact 21 that is closed by the operating bar 242 operated by every multiplier digit key 236 to send a pulse to the magnet 94 which operates the contact arm 92 of the stepping switch 99. From the magnet 94 the line extends to the contact 15' and to the ground 15. The switch 99 controls the lighting of the decimal point indicator light 113 in the multiplier dials 114. The conductor 24 also extends to the arcuate contact member 105 of said switch and normally the contact arm 92 closes the contact for the decimal point indicator light 113 which is positioned to the left of the first dial 114 subject to operation during multiplying operations. From the indicator lights the line extends to the common return wire 135 and then to the return line 15. As fully described in said patent to Friden the dials 114 are operated during multiplying operation in succession to indicate the digits of the multiplier. For division the operation selecting switch 40 is set to dividing operation position as shown in Fig. 22 and thereby opens the contact 20 and closes the contacts 44 and 41. The line then extends from the closed switch 10*c*, through conductor 42 to contact 41 and to the arcuate conductor 106 of the stepped switch 134. The contact arm 137 of this switch normally closes the contact 201 thereon, that connects with the decimal point light for the second dial subject to actuation in dividing operation and all of the indicator lights have one side connected to a common conductor 135 that connects with the return line 15. The key board is operated, inclusive the decimal point key, to set up the dividend and the operation of the decimal point key closes the respective contact 60*c*. The circuit now extends through to the conductor 10' to the respective decimal point indicator light 87 in the key set dials 56 that display the dividend. From the conductor 10' a branch line 11 extends to the selected one of a group of stop magnets 180 and then to a common conductor 12 thereof. This line extends to the solenoid 149 which operates the contact arm 137 of the switch 134 in clockwise direction as viewed in the Figs. 10 and 22. From the solenoid 149 the circuit extends to the closed contact 172*c*, then to the closed contact 44 and from there to the return line 15. The closing of the described circuit causes the solenoid to move the contact arm 137 of the switch 134 and causes the respective stop magnet 180 to stop the movement of the contact arm after it has moved as many contact steps as are integers in the dividend set up on the key board. As fully described in said patent, the dividend is then transferred into the register dials and the machine is set for repeat substraction by the operation of the control key 173, see Figs. 14 and 22. Then the divisor inclusive its decimal point, is set up on the key board. The operation of the divisor decimal point key closes the respective contact 60*c* and lights the corresponding decimal point light 87 in the key set dials 56 which display the divisor. The respective branch line 11 extends the circuit to the selected one of the stop magnets 190 and the common conductor 16 of these magnets extends to the solenoid 150 that moves the contact arm 137 of the switch 134 in counter-clockwise direction, as viewed in Figs. 10 and 22. The contact arm is stopped by the respective stop 163 after it has moved from its first set position as many steps as are integers in the divisor and thereby lights the decimal point indicator in the quotient dials which indicates the decimal point of the quotient shown in the dials at the conclusion of the dividing calculation. From the solenoid 150 the line extends to the closed contact 173*c*, then to the closed contact 44, and then to the return line 15**.

See Fig. 22. Upon conclusion of a calculating operation, the clear key 171, provided in said patent, is operated and closes a contact **171*c* for a circuit to the magnets 155, 108', 69 and 125. The magnet 69 resets a set decimal point key and thereby opens the respective contact 60*c*, as described; the magnet 155 resets the contact arm 137 of the switch 134 to normal position by operating the detent 154; the magnet 125 resets the multiplier decimal point key by operating the detent 122 and the magnet 108' resets the contact arm 92 of the switch 99 by operating the detent 108. The magnet 69 is also operated when the dividend, inclusive its decimal point key, is cleared from the key board by the operation of the control key 171**, as described hereinbefore.

What I claim is:

1. In a calculating machine having a key board comprising rows of digit keys, a register carriage with numeral dials, a carriage shifting device to impart step by step movement to the carriage, differential actuators for the register dials under control of the key board, cyclic drive means for the actuators, multiplier keys sequentially operated to control multi-cyclic operation of the actuators followed by operation of the carriage shifting device, the combination of individual decimal point indicators for the register dials, settable to indicating position, a setting device for the decimal point indicators for each row of digit keys, a series of decimal point keys on said key board, one for each row of digit keys, means under control of each decimal point key to set the respective setting device from ineffective to effective position whereby it sets an indicator to indicating position and is positioned to set decimal point indicators, in succession, to indicating position upon step by step movement of the register carriage, means connected to each of said indicators, effective upon an indicator being set to indicating position, to cause resetting of the adjacent indicator to non-indicating position, these means functioning co-jointly with any setting device in effective position, and upon step by step movement of the register carriage, to thereby reset in succession to non-indicating position all but the last set indicator, a single multiplier decimal point key operable in its proper sequence when the multiplier digit keys are operated for multiplying operation, and means under control of the multiplier decimal point key to cause resetting of any setting device for the register decimal point indicators, to ineffective position.

2. In a calculating machine having a key board comprising rows of digit keys, a register carriage with numeral dials, a carriage shifting device to impart step by step movement to the carriage, differential actuators for the register dials under control of the keyboard, cyclic drive means for the actuators, multiplier keys sequentially operated to control multi-cyclic operation of the actuators followed by operation of the carriage shifting device, the combination of a decimal point indicating device for the register dials comprising a series of decimal point indicating lights for the register dials in said carriage, selectively lightable to indicate the decimal point of a figure shown in the dials, individual contacts for said indicator lights, electric circuit means in said carriage whereby the closing of a contact lights the respective indicator light, a series of decimal point keys on the keyboard, one for each row of digit keys, a contact closing means including an electric circuit under control of each of the decimal point keys, operable to close the contact of a register decimal point indicating light and to close the contacts of indicator lights, in succession, upon successive step by step movement of the register carriage, means to open the contact of an indicator light upon the closing of the contact of the adjacent indicator light, a multiplier decimal point key operable in its proper sequence when the multiplier digit keys are operated, and means under control of the multiplier decimal point key to open said circuit, to thereby retain the last contact in closed position and the respective indicator light lighted, to indicate the decimal point of the product figures in the register dials upon conclusion of a multiplying calculation.

3. In a calculating machine having a keyboard comprising rows of digit keys, a register carriage with numeral dials, a carriage shifting device to impart step by step movement to the carriage, differential actuators for the register dials under control of the keyboard, cyclic drive means for the actuators, multiplier keys sequentially operated to control multi-cyclic operation of the actuators followed by operation of the carriage shifting device, the combination of a decimal point indicating device for the register dials comprising individual lights for the dials selectively lightable to indicate the decimal point of a figure shown in the dials, electric circuit means in said carriage comprising a current conducting rail conductively connected to one side of all of said decimal point indicating lights, a second current conducting rail conductively connected to individual contacts for the indicator lights, said contacts being selectively operable to close the circuit extending to the other side of the selected indicator light, a series of decimal point keys on the keyboard one for each row of digit keys, means under control of each decimal point key to cause closing of decimal point indicator contact and the closing of contacts, in succession, upon step by step movement of the register carriage, means connected to each of said indicator contacts effective upon a contact being set to closed position, to cause opening of the contact for the adjacent indicator light, these means functioning co-jointly with the contact closing means under control of the decimal point key operated and upon step by step movement of the register carriage, to thereby open in succession all but the last closed contact and thereby retain the respective indicator light lighted, a single multiplier decimal point key operable in its proper sequence when the multiplier digit keys are operated for multiplying operation and means under control of the multiplier decimal point key to disable the contact closing means of the decimal point keys of the keyboard.

4. In a calculating machine having a keyboard with denominational rows of digit keys, an accumulator carriage with register numeral dials, a shifting device for the accumulator carriage to impart step by step movement to the carriage, differential actuators for the numeral dials under control of the keyboard, cyclic drive means for the actuators under control of the keyboard, and a revolution counter including a group of numeral dials operable jointly by said cyclic drive means and said shifting device to display the numerals of a quotient, the combination of individual decimal point indicating lights for the quotient dials, selectively lightable to indicate the decimal point of a quotient, a multiple contact switch connected to an electric current line and having a contact connected with each of said decimal point indicating lights, a contact arm on said switch movable to a selected contact to thereby close the circuit for the respective decimal point indicating light, a common return line for the said lights, decimal point digit keys on the keyboard, one for each row of keys, and operable in their proper sequence when the dividend and divisor are set up on the key board, a first actuating means under control of the decimal point keys, when operated to set up the dividend, to move said contact arm from its normal position as many contact steps as there are integers in the dividend, a second actuating means under control of the decimal point keys when operated to set up the divisor, to move said contact arm in the reverse direction as many contact steps as there are integers in the divisor, and a key operable to disconnect said first actuating means from the decimal point keys and to connect said second actuating means thereto, thereby to select the contact thereon that closes the circuit for the decimal point indicating light that indicates the decimal point of the quotient shown in the dials upon conclusion of a dividing calculation.

5. In a calculating machine having a keyboard comprising rows of digit keys, a register carriage with numeral dials, a shifting device for the register carriage to impart step by step movement to the carriage, differential actuators or the numeral dials under control of the keyboard, cyclic drive means for the actuators, multiplier digit keys to control the multi-cyclic operations of the actuators, a group of multiplier numeral dials operable jointly by the cyclic drive means for the actuators and the shifting device for the carriage, to display the digits of the multiplier, the combination of a multiplier decimal point key operable in its proper sequence when the multiplier is introduced by the multiplier digit keys, individual decimal point indicator lights for the multiplier dials selectively lightable to indicate the decimal point of the multiplier, a multiple contact selecting switch operable step by step from contact to contact to close the circuit for the indicator light that indicates the decimal point of the multiplier displayed in the multiplier dials, means under control of the multiplier digit keys to operate the said switch a step movement for every digit key operation, and means under control of the multiplier decimal point key, to terminate the operation of said switch by the multiplier digit keys and retain it in last set position.

6. In a calculating machine having a keyboard with denominational rows of digit keys, an accumulator carriage with register numeral dials, a shifting device for the carriage to impart step-by-step movement to the carriage, differential actuators for the numeral dials under control of the keyboard, cyclic drive means for the actuators, and a revolution counter including a group of quotient numeral dials operable jointly by said cyclic drive means and said shifting device to display the numerals of the quotient, the combination of individual decimal point indicating lights for the quotient dials selectively lightable to indicate the decimal point of a quotient, a multiple contact switch connected to an electric current line and having a contact connected with each of said decimal point indicating lights, a contact arm on said switch connected to said line and movable in either direction from a normal position to a selected contact to thereby close the circuit for the respective decimal point indicating light, a common return line for the said lights, decimal point keys on the keyboard, one for each row of digit keys, and operable in their proper sequence when the dividend and divisor are set up on the keyboard, a first electric circuit under control of the decimal point keys when operated to set up a dividend to move the contact arm of the switch in one direction from its normal position as many contact steps as there are integers in the dividend, a second electric circuit under control of the decimal point keys when operated to set up a divisor to move said contact arm in the reverse direction as many contact steps as there are integers in the divisor, and a key operable to disconnect said first circuit from said decimal point keys and to disconnect said second circuit with said decimal point keys, whereby the operation of the decimal point keys to set up the divisor will select the contact that closes the circuit for the decimal point indicating light that indicates the decimal point of the quotient shown in the dials upon conclusion of a dividing calculation.

7. In a calculating machine having a keyboard with denominational rows of digit keys, an accumulator carriage with register numeral dials, a carriage-shifting device to impart step-by-step movement to said carriage, differential actuators for the numeral dials under control of the keyboard, cyclic drive means for the actuators, and a revolution counter including a group of quotient numeral dials operable jointly by said cyclic drive means and said shifting device to display the numerals of the quotient, the combination of individual decimal point indicators for the quotient dials settable to indicate the decimal point of the numerals shown in the quotient dials, a setting device for the decimal point indicators, comprising a movable member, movable in either direction from a normal position to select a decimal point indicator for indicator setting operation, a series of decimal point keys on the keyboard, one for each row of digit keys, and operable in their proper sequence when the keyboard is operated to set up a dividend and divisor, a first means under control of the decimal point keys when operated to set up the dividend, to impart movement in one direction to the movable member in proportion to the number of integers in the dividend, a second means under control of the decimal point keys when operated to set up a divisor to move said movable member in the reverse direction in proportion to the integers in the divisor, and a key operable to disconnect said first means from and to connect said second means to said decimal point keys, whereby the operation of the decimal point keys moves said movable member from its normal position in proportion to the difference of the number of integers in the dividend and divisor and selects the indicator that represents the decimal point of the quotient shown in the dials upon conclusion of the dividing calculation.

8. In a calculating machine having a keyboard comprising denominational rows of digit keys, an accumulator carriage with register numeral dials, differential actuators for the numeral dials under control of the keyboard, cyclic drive means for the actuators, a shifting device for the carriage to move it step by step, and a revolution counter including a group of denominational quotient numeral dials operable jointly by said cyclic drive means and said shifting device to display the numerals of the quotient, such operation starting with the dial of highest decimal order, the combination of individual decimal point indicating lights for the quotient dials, selectively lightable to indicate the decimal point of the quotient shown in the dials, a contact device operable to close the circuit for a selected decimal point indicator light, comprising contacts in spaced positions, one for each indicator light, said contact device being normally positioned to close the circuit for the indicator light for the dial of second highest decimal order, decimal point keys on the keyboard, one for each row of keys and operable in their proper sequence when the keyboard is operated to set up a dividend and divisor, a first actuating means under control of the decimal point keys, when operated to set up a dividend, to operate the contact device and position it as many spaced contact positions from normal position as there are integers in the dividend, a second actuating means under control of the decimal point keys, when operated to set up a divisor, to move the contact device in a reverse direction as many spaced contact positions as are integers in the divisor, and a key operable to disconnect said first actuating means from and to connect said second actuating means to the decimal point keys, whereby the operation of the decimal point keys positions said contact device to close the circuit for the indicator light that indicates the decimal point of the quotient shown in the dials upon conclusion of the dividing calculation.

9. In a calculating machine having a keyboard comprising denominational rows of digit keys, an accumulator carriage with register numeral dials, a carriage-shifting device to impart step-by-step movement to the carriage, differential actuators for the accumulator dials under control of the keyboard, cyclic drive means for the actuators under control of a cycle repeat key, and a revolution counter including a group of quotient numeral dials operable jointly by said cyclic drive means and said shifting device to display the numerals of the quotient, the combination of a series of decimal point keys, one for each row of digit keys, operable in their proper sequence when the digit keys are operated to set up a dividend or divisor, individual decimal point indicators for the quotient dials settable to indicate the decimal point of a quotient displayed in the quotient dials, a decimal point setting device operable to set the decimal point indicators for the quotient dials, comprising a member movable from normal position in either direction, first actuating means under control of the decimal point keys when operated to set up a dividend to impart movement to said member from normal position in proportion to the integers of the dividend, a second actuating means under control of the decimal point keys when operated to set up a divisor to move said member in the reverse direction and in proportion to the integers in the divisor, and a key operable to disable said first actuating means and to connect said second actuating means to the decimal point keys to thereby set the decimal point indicator of the quotient dials to indicate the decimal point of the quotient displayed in the dials upon conclusion of the dividing calculation.

10. In a calculating machine having a keyboard comprising denominational rows of digit keys, an accumulator carriage with register numeral dials, a carriage-shifting device to impart step-by-step movement to the carriage, differential actuators for said register numeral dials under control of the keyboard, cyclic drive means for the actuators under control of a cycle repeat key, and a revolution counter including a group of quotient numeral dials operable jointly by said cyclic drive means and said shifting device to display the numerals of the quotient, the combination of decimal point keys, one for each row of digit keys and operable in their proper sequence when the digit keys are operated to set up a dividend or divisor, individual decimal point indicator lights for the quotient dials lightable to indicate the decimal point of the quotient displayed in the quotient dials, a decimal point indicating device comprising a stepping switch having a series of contacts and a contact arm connected to a line current and movable in either direction from a normal position, said contacts being connected with the indicator lights for the quotient dials, a differential mechanism to operate said contact arm comprising a driven member and two driving members, said driving members being operable to move the driven member in opposite directions, respectively, said driven member being connected to said contact arm to move it in either direction from a normal position, a first means under control of the decimal point keys, when operated to set up the dividend, to move one of said driving members in proportion to the number of integers of the dividend, a second means under control of the decimal point keys when operated to set up the divisor to move the other of said driving members in proportion to the number of integers of the divisor, and a key operable to disconnect said first means from the decimal point keys and connect said second means with said decimal point keys.

11. In a calculating machine having a keyboard comprising denominational rows of digit keys, an accumulator carriage with register numeral dials, a shifting device for the accumulator carriage to impart step-by-step movement to the carriage, differential actuators for the numeral dials under control of the keyboard, cyclic drive means for the actuators, multiplier digit keys operable to control the multicyclic operations of the actuators, followed by the operation of the carriage-shifting device, a group of multiplier numeral dials, and a counter actuator shiftable in step movement relative to said dials and in synchronism with the carriage to select the dials for operation by the cyclic drive means, the combination of a multiplier decimal point indicating device comprising decimal point indicators for said multiplier dials, a member movable step by step to select a multiplier decimal point indicator, first actuating means under control of the multiplier digit keys to move said member step by step by the operation of the multiplier digit keys when operated to set up the multiplier, a multiplier decimal point key, and second actuating means under control of said multiplier decimal point key when operated in its proper sequence when the multiplier is set up, to disable said first actuating means and thereby terminate the movement of the selecting member whereby it is retained in its last set position.

12. In a calculating machine having a keyboard comprising denominational rows of digit keys, an accumulator carriage with accumulator numeral dials, a carriage-shifting device to impart step-by-step movement to the carriage, differential actuators for the accumulator dials under control of the keyboard, cyclic drive means for the actuators under control of a cycle repeat key, and a revolution counter including a group of quotient numeral dials operable jointly by said cyclic drive means and said shifting device to display the numerals of the quotient, the combination of a series of decimal point keys, one for each row of digit keys, operable in their proper sequence when the digit keys are operated to set up a dividend or divisor, decimal point indicating means for the quotient dials, said decimal point indicating means being settable to indicate the decimal point of a quotient displayed in the quotient dials, a decimal point setting device operable to set the decimal point indicating means for the quotient dials, comprising a member movable from normal position in either direction, first actuating means under control of the decimal point keys, when operated to set up a dividend, to impart movement to said member in one direction from normal position in proportion to the integers of the dividend, a second actuating means under control of the decimal point keys, when operated to set up a divisor, to move said member in the reverse direction and in proportion to the integers in the divisor, and a key operable to disable said first actuating means and to connect said second actuating means to the decimal point keys to thereby set the decimal point indicator of the quotient dials to indicate the decimal point of the quotient displayed in the dials upon conclusion of the dividing calculation.

References Cited in the file of this patent

UNITED STATES PATENTS

| | | |
|---|---|---|
| 1,503,742 | Bacon | Aug. 5, 1924 |
| 1,643,710 | Friden | Sept. 27, 1927 |
| 2,329,190 | Ellerbeck | Sept. 14, 1943 |
| 2,467,419 | Avery | Apr. 19, 1949 |
| 2,628,031 | Ellerbeck | Feb. 10, 1953 |
| 2,643,822 | Allen et al. | June 30, 1953 |
| 2,673,684 | Reppert | Mar. 30, 1954 |